United States Patent
Tang

(10) Patent No.: US 11,178,571 B2
(45) Date of Patent: Nov. 16, 2021

(54) METHOD AND DEVICE FOR CONTROLLING DATA REPLICATION FUNCTION AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/759,623

(22) PCT Filed: Apr. 24, 2018

(86) PCT No.: PCT/CN2018/084178
§ 371 (c)(1),
(2) Date: Apr. 27, 2020

(87) PCT Pub. No.: WO2019/091053
PCT Pub. Date: May 16, 2019

(65) Prior Publication Data
US 2020/0314689 A1    Oct. 1, 2020

(30) Foreign Application Priority Data

Nov. 10, 2017   (WO) ................ PCT/CN2017/110559

(51) Int. Cl.
*H04W 28/06*      (2009.01)
*H04W 76/15*      (2018.01)
(Continued)

(52) U.S. Cl.
CPC ........... *H04W 28/06* (2013.01); *H04W 76/15* (2018.02); *H04W 80/02* (2013.01); *H04W 80/08* (2013.01)

(58) Field of Classification Search
None
See application file for complete search history.

(56) References Cited

U.S. PATENT DOCUMENTS

2018/0310202 A1* 10/2018 Lohr .................... H04W 76/19
2019/0098529 A1* 3/2019 Park ................ H04W 28/0231
(Continued)

FOREIGN PATENT DOCUMENTS

CN      102655447       9/2012
CN      103517351       1/2014
(Continued)

OTHER PUBLICATIONS

Samsung, "SRB split and duplication for LTE-NR interworking," 3GPP TSG-RAN WG2 Meeting #98, R2-1705246, May 2017, 3 pages.
(Continued)

*Primary Examiner* — Diane L Lo
(74) *Attorney, Agent, or Firm* — Hodgson Russ LLP

(57) ABSTRACT

A method for controlling a data duplication function include: receiving, by a terminal, medium access control-control element (MAC CE) sent by a base station, the MAC CE supporting a first network protocol; and controlling, by the terminal based on the MAC CE, the data duplication function of a packet data convergence protocol (PDCP) entity of the terminal, the PDCP entity supporting a second network protocol.

8 Claims, 4 Drawing Sheets

(51) Int. Cl.
*H04W 80/02* (2009.01)
*H04W 80/08* (2009.01)

(56) References Cited

U.S. PATENT DOCUMENTS

2019/0098533 A1* 3/2019 Babaei .............. H04W 72/0413
2020/0077459 A1* 3/2020 Yi .................... H04W 72/0413

FOREIGN PATENT DOCUMENTS

| CN | 104581824 | 4/2015 |
| CN | 106165488 | 11/2016 |
| CN | 107078968 | 8/2017 |
| WO | 2006073100 | 7/2006 |
| WO | 2017049558 | 3/2017 |

OTHER PUBLICATIONS

Oppo, "LTE MAC CE control of UL duplication in EN-DC," 3GPP TSG-RAN2 Meeting #101, R2-1801840, Feb. 2018, 2 pages.
Nokia et al., "More consideration on uplink duplication in dual connectivity," 3GPP TSG-RAN WG2 #99, R2-1709425, Aug. 2017, 2 pages.
Huawei et al., "Discussion on Packet Duplication," 3GPP TSG-RAN2 Meeting #99bis, R2-1711115, Oct. 2017, 4 pages.
EPO, Extended European Search Report for EP Application No. 18876857.6, dated Dec. 15, 2020.
Ericsson, "Data duplication in lower layers (HARQ)," 3GPP TSG-RAN WG2 #97, Tdoc R2-1702032, revision of R2-1700833, Feb. 2017, 6 pages.
WIPO, ISR for PCT/CN2018/084178, dated Aug. 6, 2018.
WIPO, ISR for PCT/CN2017/110559, dated Jul. 31, 2018.

* cited by examiner

METHOD AND DEVICE FOR CONTROLLING DATA REPLICATION FUNCTION AND COMPUTER STORAGE MEDIUM

CROSS-REFERENCE TO RELATED APPLICATION

This application is a U.S. national phase application of International Application No. PCT/CN2018/084178, filed Apr. 24, 2018, which claims priority to International Application No. PCT/CN2017/110559, filed Nov. 10, 2017, the entire disclosures of which are incorporated herein by reference.

TECHNICAL FIELD

The present application relates to the field of mobile communication, and more particularly, to a method and a device for controlling a data duplication function and a computer storage medium.

BACKGROUND

In a wireless communication system, a packet data convergence protocol (PDCP) entity has a data duplication function. Through the PDCP entity, two copies of data can be transmitted to two radio link control protocol (RLC) entities. Data duplication on the PDCP entity supports carrier aggregation (CA) duplication and dual connectivity duplication.

In the research of new radio (NR), the version of the PDCP entity supporting the data duplication function is NR, and the version of media access control-control element (MAC CE) that can control the data duplication function of the PDCP entity is also NR. However, when long term evolution (LTE) is upgraded, there may also be a PDCP entity that supports the data duplication function and a MAC CE that can control the data duplication function of the PDCP entity. In this case, the version of the PDCP entity and the MAC CE is LTE.

In the scenario where LTE and NR coexist, how to control the PDCP entity by the MAC CE between different versions is a problem to be solved.

SUMMARY

In order to solve the technical problem as described above, embodiments of the disclosure provide a method and a device for controlling a data duplication function and a computer storage medium.

The method for controlling a data duplication function provided by the embodiments of the disclosure includes:
receiving, by a terminal, MAC CE sent by a base station, the MAC CE supporting a first network protocol; and
controlling, by the terminal based on the MAC CE, the data duplication function of a PDCP entity of the terminal, the PDCP entity supporting a second network protocol.

In an embodiment of the disclosure, the first network protocol is an LTE network protocol and the second network protocol is an NR network protocol.

In an embodiment of the disclosure, the first network protocol is an NR network protocol and the second network protocol is an LTE network protocol.

In an embodiment of the disclosure, the controlling, by the terminal based on the MAC CE, the data duplication function of a PDCP entity of the terminal includes:
controlling, by the terminal based on the MAC CE under the LTE network protocol, the data duplication function of the PDCP entity under the NR network protocol.

In an embodiment of the disclosure, the controlling, by the terminal based on the MAC CE, the data duplication function of a PDCP entity of the terminal includes:
controlling, by the terminal based on the MAC CE under the NR network protocol, the data duplication function of the PDCP entity under the LTE network protocol.

In an embodiment of the disclosure, the data duplication function is a CA duplication function; correspondingly, the PDCP entity is connected with a first RLC entity and a second RLC entity, and the first RLC entity and the second RLC entity are connected with a third MAC entity;
the controlling, by the terminal based on the MAC CE, the data duplication function of a PDCP entity of the terminal includes:
controlling, by the terminal based on the MAC CE, the CA duplication function of the PDCP entity.

In an embodiment of the disclosure, the data duplication function is a DC duplication function; correspondingly, the PDCP entity is connected with a first RLC entity and a second RLC entity, the first RLC entity is connected with a first MAC entity, and the second RLC entity is connected with a second MAC entity;
the controlling, by the terminal based on the MAC CE, the data duplication function of a PDCP entity of the terminal includes:
controlling, by the terminal based on the MAC CE, the DC duplication function of the PDCP entity.

In an embodiment of the disclosure, the PDCP entity is a PDCP entity borne by a main cell group.

In an embodiment of the disclosure, the PDCP entity is a PDCP entity borne by a secondary cell group.

In an embodiment of the disclosure, the PDCP entity is a PDCP entity using a main cell group key.

In an embodiment of the disclosure, the PDCP entity is a PDCP entity using a secondary cell group key.

In an embodiment of the disclosure, the PDCP entity is a PDCP entity of a split bearer.

In an embodiment of the disclosure, the controlling, by the terminal based on the MAC CE, the data duplication function of a PDCP entity of the terminal includes:
controlling, by the terminal based on the MAC CE, the data duplication function of the PDCP entity of the terminal to be in an activated state.

In an embodiment of the disclosure, the controlling, by the terminal based on the MAC CE, the data duplication function of a PDCP entity of the terminal includes:
controlling, by the terminal based on the MAC CE, the data duplication function of the PDCP entity of the terminal to be in an inactivated state.

The device for controlling a data duplication function provided by the embodiments of the disclosure includes:
a receiving unit, configured to receive MAC CE sent by a base station, the MAC CE supporting a first network protocol; and
a controlling unit, configured to control, based on the MAC CE, the data duplication function of a PDCP entity of the terminal, the PDCP entity supporting a second network protocol.

In an embodiment of the disclosure, the first network protocol is an LTE network protocol and the second network protocol is an NR network protocol.

In an embodiment of the disclosure, the first network protocol is an NR network protocol and the second network protocol is an LTE network protocol.

In an embodiment of the disclosure, the controlling unit is specifically configured to control, based on the MAC CE under the LTE network protocol, the data duplication function of the PDCP entity under the NR network protocol.

In an embodiment of the disclosure, the controlling unit is specifically configured to control, based on the MAC CE under the NR network protocol, the data duplication function of the PDCP entity under the LTE network protocol.

In an embodiment of the disclosure, the data duplication function is a CA duplication function; correspondingly, the PDCP entity is connected with a first RLC entity and a second RLC entity, and the first RLC entity and the second RLC entity are connected with a third MAC entity;

the controlling unit is specifically configured to control, based on the MAC CE, the CA duplication function of the PDCP entity.

In an embodiment of the disclosure, the data duplication function is a DC duplication function; correspondingly, the PDCP entity is connected with a first RLC entity and a second RLC entity, the first RLC entity is connected with a first MAC entity, and the second RLC entity is connected with a second MAC entity;

the controlling unit is specifically configured to control, based on the MAC CE, the DC duplication function of the PDCP entity.

In an embodiment of the disclosure, the PDCP entity is a PDCP entity borne by a main cell group.

In an embodiment of the disclosure, the PDCP entity is a PDCP entity borne by a secondary cell group.

In an embodiment of the disclosure, the PDCP entity is a PDCP entity using a main cell group key.

In an embodiment of the disclosure, the PDCP entity is a PDCP entity using a secondary cell group key.

In an embodiment of the disclosure, the PDCP entity is a PDCP entity of a split bearer.

In an embodiment of the disclosure, the controlling unit is specifically configured to control, based on the MAC CE, the data duplication function of the PDCP entity of the terminal to be in an activated state.

In an embodiment of the disclosure, the controlling unit is specifically configured to control, based on the MAC CE, the data duplication function of the PDCP entity of the terminal to be in an inactivated state.

The computer storage medium provided by the embodiments of the disclosure stores a computer-executable instruction thereon, the computer-executable instruction is executed by a processor to implement steps of the method for controlling the data duplication function as described above.

In the technical solution according to embodiments of the disclosure, the terminal receives MAC CE sent by the base station, the MAC CE supporting a first network protocol; and the terminal controls, based on the MAC CE, the data duplication function of the PDCP entity of the terminal, the PDCP entity supporting a second network protocol. Through adopting the technical solution according to embodiments of the disclosure, control of the PDCP entity can be achieved by the MAC CE between different network protocols (that is, different versions).

BRIEF DESCRIPTION OF THE DRAWINGS

The drawings described herein are provided for a further understanding of the disclosure and form a part of this application. The schematic embodiments of the present disclosure and the descriptions thereof are used to explain the present disclosure and do not constitute an improper limitation on the present disclosure. In the drawings.

DETAILED DESCRIPTION

In order to understand the features and technical contents of embodiments of the present disclosure in more detail, implementation of the embodiments of the present disclosure will be described in detail below with reference to the accompanying drawings. The accompanying drawings are for reference only and are not intended to limit the embodiments of the present disclosure.

In order to facilitate understanding technical solutions of the embodiments of the present disclosure, the data duplication methods involved in the embodiments of the present disclosure will be described as follows.

1) DC Duplication

Figure 1:
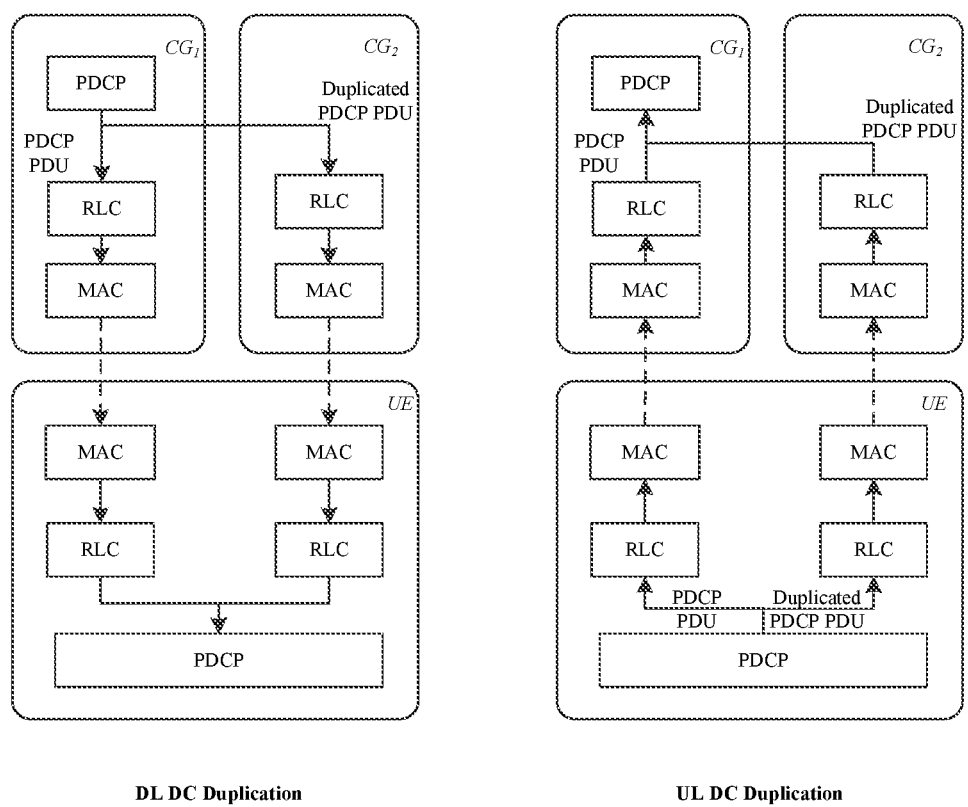
FIG. 1 is a diagram of a protocol architecture based on DC duplication according to an embodiment of the present disclosure.

FIG. 1 is a diagram of a protocol architecture based on DC duplication according to an embodiment of the present disclosure. As shown in FIG. 1, the transmission method for duplicated data uses a protocol architecture of split bearer. The left figure schematically illustrates downlink data transmission, and the right figure schematically illustrates uplink data transmission. The process of uplink data transmission corresponds to the process of downlink data transmission.

For the process of downlink data transmission, the PDCP entity is located in a certain cell group (CG, which may be the main cell group (MCG) or the secondary cell group (SCG)), and the CG is the anchor CG. The PDCP entity duplicates the PDCP service data unit (SDU) into two identical copies, for example, one is a PDCP PDU and the other is a Duplicated PDCP PDU. The two PDCP PDUs pass through RLC entities and MAC entities of different CGs (e.g., CG1 and CG2 shown in the figure), arrive at MAC entities and RLC entities corresponding to the terminal (UE, User Equipment) via the air interface, and finally converge to the PDCP entity. When the PDCP entity detects that the two PDCP PDUs are the same, it discards one of them and submits the other to a higher layer.

For the process of uplink data transmission, the PDCP entity is located at a certain terminal. The PDCP entity duplicates the PDCP SDU into two identical copies, for example, one is a PDCP PDU, and the other is a Duplicated PDCP PDU. The two PDCP PDUs pass through different RLC entities and MAC entities, arrive at MAC entities and RLC entities corresponding to two CGs (e.g., CG1 and CG2 as shown in the figure) in two ways through the air interface, and finally converge to the PDCP entity of one of the CGs (e.g., CG1 as shown in the figure). When the PDCP entity detects that the two PDCP PDUs are the same, it discards one of them and submits the other to a higher layer.

In the above solution, the bearers corresponding to the two RLC entities and MAC entities connected with the PDCP entity are referred to as split bearers. If the PDCP entity is located in the MCG, the split bearer is referred to as MCG Split Bearer. If the PDCP entity is located in the SCG, the split bearer is referred to as SCG Split Bearer.

2) CA Duplication

Figure 2:
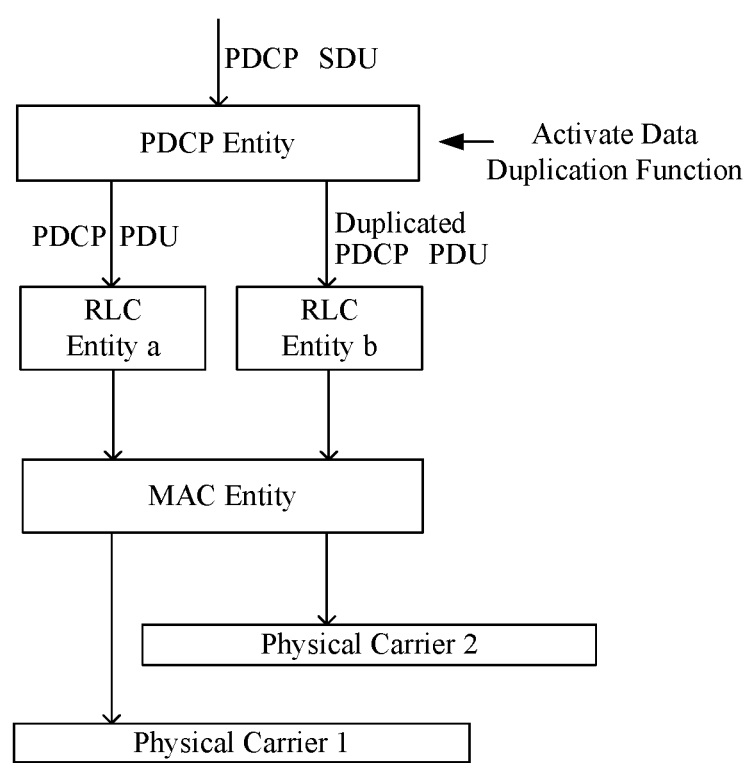
FIG. 2 is a diagram of a protocol architecture based on CA duplication according to an embodiment of the present disclosure.

FIG. 2 is a diagram of a protocol architecture based on CA duplication according to an embodiment of the present disclosure. As shown in FIG. 2, the transmission method for duplicated data uses the data duplication function of the PDCP entity, so that the two copies of PDCP PDUs are transmitted to two RLC entities (corresponding to two different logical channels), and finally that the two copies of PDCP PDUs can be transmitted on different physical layer aggregated carriers (Physical Carrier1 and Physical Carrier2 as shown in the figure), thereby achieving frequency diversity gain to improve data transmission reliability.

As can be seen from FIG. 1 and FIG. 2, for transmission of duplicated data at the terminal side, DC duplication corresponds to two MAC entities, and CA duplication corresponds to one MAC entity.

Figure 3:
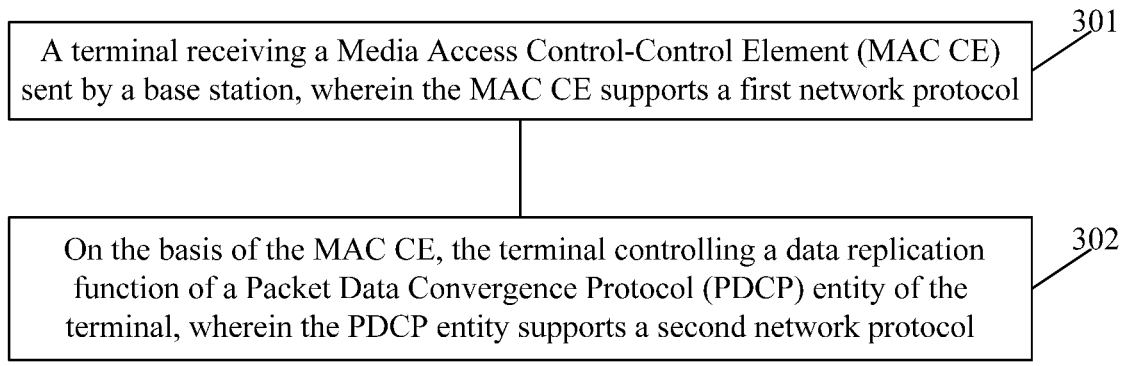
FIG. 3 is a schematic flowchart of a method for controlling a data duplication function according to an embodiment of the present disclosure.

FIG. 3 is a schematic flowchart of a method for controlling a data duplication function according to an embodiment of the present disclosure. As shown in FIG. 3, the method for controlling the data duplication function includes following steps.

In step 301, a terminal receives MAC CE sent by a base station, the MAC CE supporting a first network protocol.

In step 302, the terminal controls, based on the MAC CE, the data duplication function of a PDCP entity of the terminal, the PDCP entity supporting a second network protocol.

In embodiments of the disclosure, the first network protocol and the second network protocol are different network protocols.

For example, the first network protocol is an LTE network protocol and the second network protocol is an NR network protocol; or, the first network protocol is an NR network protocol and the second network protocol is an LTE network protocol.

In an embodiment, the first network protocol is an LTE network protocol and the second network protocol is an NR network protocol. In this case, the terminal controls, based on the MAC CE under the LTE network protocol, the data duplication function of the PDCP entity under the NR network protocol.

In an embodiment, the first network protocol is an NR network protocol and the second network protocol is an LTE network protocol. In this case, the terminal controls, based on the MAC CE under the NR network protocol, the data duplication function of the PDCP entity under the LTE network protocol.

For the above solutions, any kind of control manner may be applied in two scenarios of data duplication. The two scenarios of data duplication will be described as follows.

In the first scenario of data duplication, the data duplication function is a CA duplication function. Correspondingly, the PDCP entity is connected with a first radio link control protocol (RLC) entity and a second RLC entity, and the first RLC entity and the second RLC entity are connected with a third MAC entity, referring to FIG. 2.

In this scenario, the terminal controls, based on the MAC CE, the CA duplication function of the PDCP entity.

For example, the terminal controls, based on the MAC CE under the LTE network protocol, the CA duplication function of the PDCP entity under the NR network protocol.

For another example, the terminal controls, based on the MAC CE under the NR network protocol, the CA duplication function of the PDCP entity under the LTE network protocol.

In the second scenario of data duplication, the data duplication function is a dual connectivity (DC) duplication function. Correspondingly, the PDCP entity is connected with a first radio link control protocol (RLC) entity and a second RLC entity, the first RLC entity is connected with a first MAC entity, and the second RLC entity is connected with a second MAC entity, referring to FIG. 1.

In this scenario, the terminal controls, based on the MAC CE, the DC duplication function of the PDCP entity.

For example, the terminal controls, based on the MAC CE under the LTE network protocol, the DC duplication function of the PDCP entity under the NR network protocol.

For another example, the terminal controls, based on the MAC CE under the NR network protocol, the DC duplication function of the PDCP entity under the LTE network protocol.

In embodiments of the disclosure, the PDCP entity may be a PDCP entity borne by a main cell group, or a PDCP entity borne by a secondary cell group, or a PDCP entity using a main cell group key, or a PDCP entity using a secondary cell group key.

In an embodiment of the disclosure, the PDCP entity may be a PDCP entity of a split bearer.

In the above solutions, the terminal controls, based on the MAC CE, the data duplication function of the PDCP entity of the terminal refers to that the terminal controls, based on the MAC CE, the data duplication function of the PDCP entity of the terminal to be in an activated state, or that the terminal controls, based on the MAC CE, the data duplication function of the PDCP entity of the terminal to be in an inactivated state.

Figure 4:
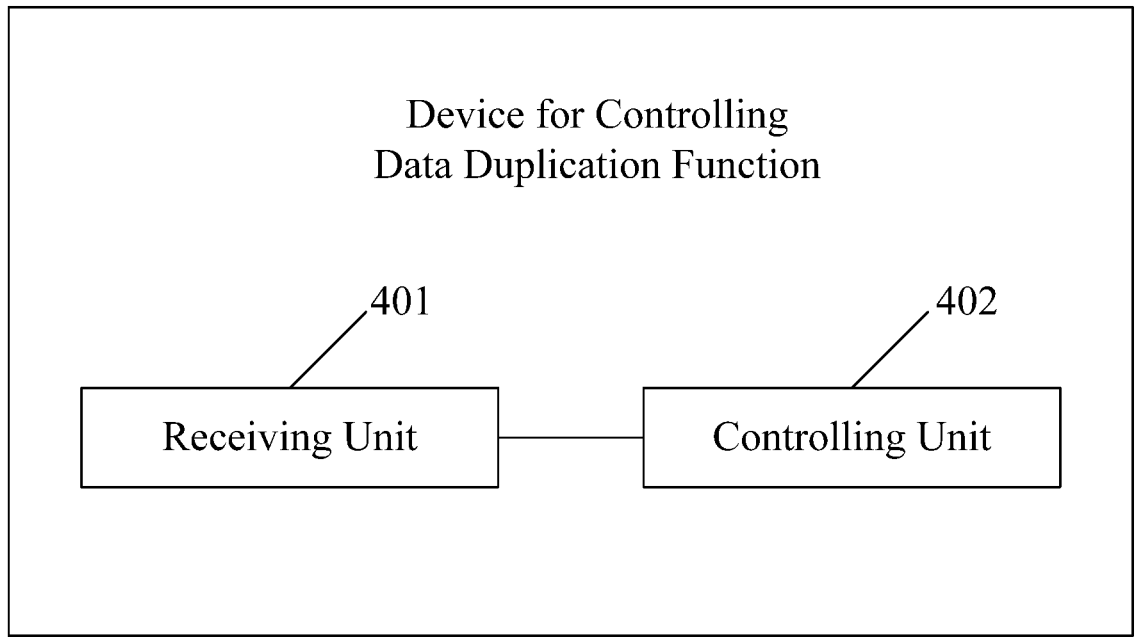
FIG. 4 is a schematic block diagram of a device for controlling a data duplication function according to an embodiment of the present disclosure.

FIG. 4 is a schematic block diagram of a device for controlling a data duplication function according to an embodiment of the present disclosure. As shown in FIG. 4, the device includes:

a receiving unit 401, configured to receive MAC CE sent by a base station, the MAC CE supporting a first network protocol; and a controlling unit 402, configured to control, based on the MAC CE, the data duplication function of a PDCP entity of the terminal, the PDCP entity supporting a second network protocol.

In an embodiment of the disclosure, the first network protocol is an LTE network protocol and the second network protocol is an NR network protocol.

In an embodiment of the disclosure, the first network protocol is an NR network protocol and the second network protocol is an LTE network protocol.

In an embodiment of the disclosure, if the first network protocol is an LTE network protocol and the second network protocol is an NR network protocol, the controlling unit 402 is specifically configured to control, based on the MAC CE under the LTE network protocol, the data duplication function of the PDCP entity under the NR network protocol.

In an embodiment of the disclosure, if the first network protocol is an NR network protocol and the second network protocol is an LTE network protocol, the controlling unit 402 is specifically configured to control, based on the MAC CE under the NR network protocol, the data duplication function of the PDCP entity under the LTE network protocol.

In an embodiment of the disclosure, the data duplication function is a CA duplication function; correspondingly, the PDCP entity is connected with a first RLC entity and a second RLC entity, and the first RLC entity and the second RLC entity are connected with a third MAC entity;

the controlling unit 402 is specifically configured to control, based on the MAC CE, the CA duplication function of the PDCP entity.

In an embodiment of the disclosure, the data duplication function is a dual connectivity (DC) duplication function; correspondingly, the PDCP entity is connected with a first RLC entity and a second RLC entity, the first RLC entity is connected with a first MAC entity, and the second RLC entity is connected with a second MAC entity;

the controlling unit 402 is specifically configured to control, based on the MAC CE, the DC duplication function of the PDCP entity.

In an embodiment of the disclosure, the PDCP entity is a PDCP entity borne by a main cell group.

In an embodiment of the disclosure, the PDCP entity is a PDCP entity borne by a secondary cell group.

In an embodiment of the disclosure, the PDCP entity is a PDCP entity using a main cell group key.

In an embodiment of the disclosure, the PDCP entity is a PDCP entity using a secondary cell group key.

In an embodiment of the disclosure, the PDCP entity is a PDCP entity of a split bearer.

In an embodiment of the disclosure, the controlling unit 402 is specifically configured to control, based on the MAC CE, the data duplication function of the PDCP entity of the terminal to be in an activated state.

In another embodiment of the disclosure, the controlling unit 402 is specifically configured to control, based on the MAC CE, the data duplication function of the PDCP entity of the terminal to be in an inactivated state.

Those skilled in the art should understand that the implementation function of each unit in the device for controlling data duplication function shown in FIG. 4 can be understood by referring to the related description of the method for controlling data duplication function. The functions of the units in the device for controlling data duplication function shown in FIG. 4 may be implemented by a program running on a processor, or may be implemented by a specific logic circuit.

In the embodiment of the present disclosure, if the device for controlling data duplication function is implemented in the form of a software function module and sold or used as an independent product, and may also be stored in a computer-readable storage medium. Based on such an understanding, the technical solutions of the embodiments of the present disclosure that are essential or contribute to the prior art may be embodied in the form of a software product. The computer software product is stored in a storage medium and includes several instructions for causing a computer device (which may be a personal computer, a server, a network device or the like) to perform all or part of the methods described in the embodiments of the present disclosure. The foregoing storage medium includes various medium that can store program codes, such as a U disk, a mobile hard disk, a read only memory (ROM), a magnetic disk, or an optical disk. In this way, the embodiments of the present disclosure are not limited to any specific combination of hardware and software.

Correspondingly, an embodiment of the present disclosure further provides a computer storage medium in which computer-executable instructions are stored. When the computer-executable instructions are executed by a processor, the foregoing method for controlling the data duplication function according to the embodiments of the present disclosure.

Figure 5:
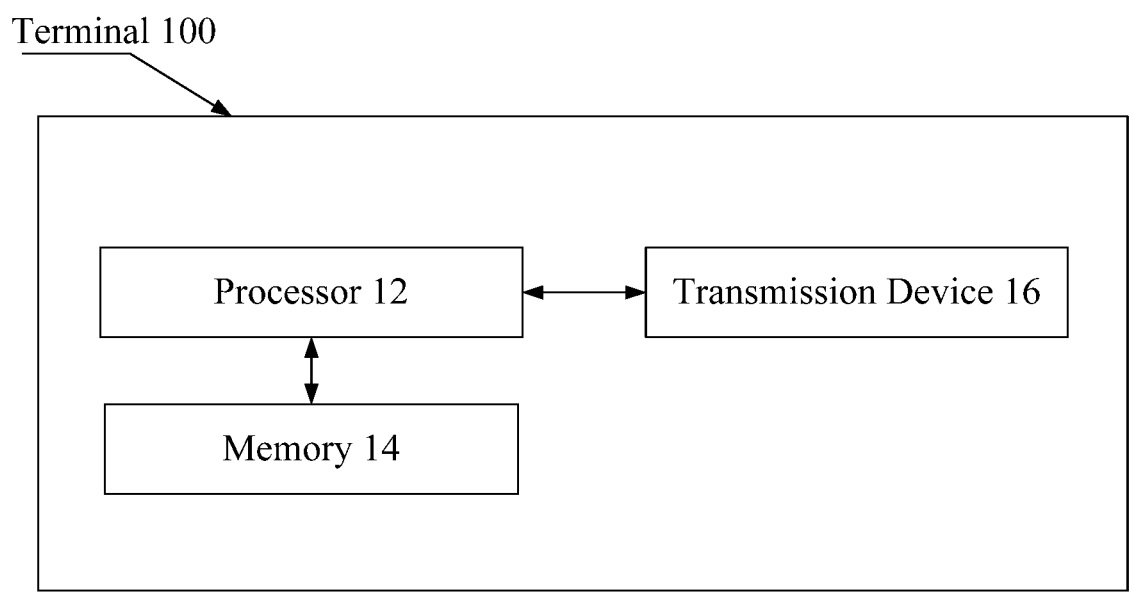
FIG. 5 is a schematic block diagram of a terminal according to an embodiment of the present disclosure.

FIG. 5 is a schematic block diagram of a terminal according to an embodiment of the present disclosure. As shown in FIG. 5, the terminal 100 may include one or more (only one shown in the figure) processors 12 (the processor 12 may include but is not limited to a micro controller unit (MCU) or a programmable logic device (FPGA, Field Programmable Gate Array)), a memory 14 for storing data, and a transmission device 16 for communication functions. Those skilled in the art can understand that the structure shown in FIG. 5 is only illustrative, and does not limit the structure of the electronic device. For example, the terminal 100 may further include more or fewer components than those shown in FIG. 5, or have a configuration different from that shown in FIG. 5.

The memory 14 may be used for storing software programs and modules of application software, such as program instructions/modules corresponding to the method for controlling data duplication function in the embodiments of the present disclosure. The processor 12 performs various functional applications and data processing, that is, implements the method described above, by executing the software programs and modules in the memory 14. The memory 14 may include a high-speed random access memory, and may also include a non-volatile memory, such as one or more magnetic storage devices, a flash memory, or other non-volatile solid-state memory. In some examples, the memory 14 may further include memories remotely provided with respect to the processor 12, and these remote memories may be connected to the terminal 100 through a network. Examples of the above network include, but are not limited to, the Internet, an intranet, a local area network, a mobile communication network, and combinations thereof.

The transmission device 16 is used for receiving or transmitting data via a network. The specific examples of the network may include a wireless network provided by a communication provider of the terminal 100. In an example, the transmission device 16 includes a network adapter (NIC, Network Interface Controller), which can be connected to other network devices through a base station so as to communicate with the Internet. In an example, the transmission device 16 may be a radio frequency (RF) module, which is configured to communicate with the Internet in a wireless manner.

The technical solutions described in the embodiments of the present disclosure can be arbitrarily combined without conflict.

In the several embodiments provided by the present disclosure, it should be understood that the disclosed method and smart device may be implemented in other ways. The device embodiments described above are only schematic. For example, the division of the units is only a logical function division. In actual implementation, there may be another division manner, for example, multiple units or components may be combined, or may be integrated into another system, or some features can be ignored or not implemented. In addition, the displayed or discussed components are coupled, or directly coupled, or communicated with each other through some interfaces. The indirect coupling or communication of the devices or units may be electrical, mechanical, or in other forms.

The units described above as separate components may be or may not be physically separated, and the components displayed as units may be or may not be physical units, which may be located in one place or distributed at multiple network units. Some or all of the units may be selected according to actual needs to achieve the objective of the solution of the embodiments.

In addition, each functional unit in each embodiment of the present disclosure may be integrated into a second processing unit, or each unit may be separately used as a unit, or two or more units may be integrated into one unit. The above integrated unit may be implemented in the form of hardware, or in the form of hardware plus software functional units.

The above are only specific embodiments of the present disclosure, but the protection scope of the present disclosure is not limited thereto. Those skilled in the art can easily think of changes or replacements within the technical scope disclosed by the present disclosure, which should fall within the protection scope of the present disclosure.

What is claimed is:

1. A method for controlling a data duplication function, comprising:
   receiving, by a terminal, medium access control-control element (MAC CE) sent by a base station, the MAC CE supporting a long-term evolution (LTE) network protocol; and
   controlling, by the terminal based on the MAC CE under the LTE network protocol, the data duplication function of a packet data convergence protocol (PDCP) entity of the terminal, the PDCP entity supporting a new radio (NR) network protocol,
   wherein the data duplication function is a carrier aggregation (CA) duplication function; correspondingly, the PDCP entity is connected with a first radio link control protocol (RLC) entity and a second RLC entity, and the first RLC entity and the second RLC entity are connected with a MAC entity; and
   wherein controlling, by the terminal based on the MAC CE under the LTE network protocol, the data duplication function of the PDCP entity of the terminal comprises:
      controlling, by the terminal based on the MAC CE under the LTE network protocol, the CA duplication function of the PDCP entity.

2. The method for controlling a data duplication function according to claim 1, wherein the PDCP entity is any one selected from a group comprising:
   a PDCP entity borne by a main cell group;
   a PDCP entity borne by a secondary cell group;
   a PDCP entity using a main cell group key;
   a PDCP entity using a secondary cell group key; and
   a PDCP entity of a split bearer.

3. The method for controlling a data duplication function according to claim 1, wherein the controlling, by the terminal based on the MAC CE under the LTE network protocol, the data duplication function of a PDCP entity of the terminal comprises one of the following:
   controlling, by the terminal based on the MAC CE under the LTE network protocol, the data duplication function of the PDCP entity of the terminal to be in an activated state; and
   controlling, by the terminal based on the MAC CE under the LTE network protocol, the data duplication function of the PDCP entity of the terminal to be in an inactivated state.

4. A device for controlling a data duplication function, comprising:
   a transmission device, configured to receive medium access control-control element (MAC CE) sent by a base station, the MAC CE supporting a long-term evolution (LTE) network protocol; and
   a processor, configured to control, based on the MAC CE under the LTE network protocol, the data duplication function of a packet data convergence protocol (PDCP) entity of the device, the PDCP entity supporting a new radio (NR) network protocol,
   wherein the data duplication function is a carrier aggregation (CA) duplication function; correspondingly, the PDCP entity is connected with a first radio link control protocol (RLC) entity and a second RLC entity, and the first RLC entity and the second RLC entity are connected with a MAC entity; and
   wherein the processor is specifically configured to control, based on the MAC CE under the LTE network protocol, the CA duplication function of the PDCP entity.

5. The device for controlling a data duplication function according to claim 4, wherein the PDCP entity is any one selected from a group comprising:
   a PDCP entity borne by a main cell group;
   a PDCP entity borne by a secondary cell group;
   a PDCP entity using a main cell group key;
   a PDCP entity using a secondary cell group key; and
   a PDCP entity of a split bearer.

6. The device for controlling a data duplication function according to claim 4, wherein,
   the processor is specifically configured to control, based on the MAC CE under the LTE network protocol, the data duplication function of the PDCP entity of the terminal to be in an activated state.

7. The device for controlling a data duplication function according to claim 4, wherein,
   the processor is specifically configured to control, based on the MAC CE under the LTE network protocol, the data duplication function of the PDCP entity of the terminal to be in an inactivated state.

8. A non-transitory computer storage medium storing a computer-executable instruction, the computer-executable instruction is executed by a processor of a terminal to implement steps of:
   receiving medium access control-control element (MAC CE) sent by a base station, the MAC CE supporting a long-term evolution (LTE) network protocol; and
   controlling, based on the MAC CE under the LTE network protocol, a data duplication function of a packet data convergence protocol (PDCP) entity of the terminal, the PDCP entity supporting a new radio (NR) network protocol,
   wherein the data duplication function is a carrier aggregation (CA) duplication function; correspondingly, the PDCP entity is connected with a first radio link control protocol (RLC) entity and a second RLC entity, and the first RLC entity and the second RLC entity are connected with a MAC entity; and
   wherein controlling, based on the MAC CE under the LTE network protocol, the data duplication function of the PDCP entity of the terminal comprises:
      controlling, based on the MAC CE under the LTE network protocol, the CA duplication function of the PDCP entity.

* * * * *